(12) United States Patent
Wade

(10) Patent No.: US 7,200,932 B2
(45) Date of Patent: Apr. 10, 2007

(54) LASER WELDED MULTI-LAYERED STEEL GASKET ASSEMBLY

(75) Inventor: Lloyd Garrold Wade, Somerville, AL (US)

(73) Assignee: Federal-Mogul Worldwide, Inc., Southfield, MI (US)

( * ) Notice: Subject to any disclaimer, the term of this patent is extended or adjusted under 35 U.S.C. 154(b) by 414 days.

(21) Appl. No.: 10/756,591

(22) Filed: Jan. 13, 2004

(65) Prior Publication Data
US 2005/0151326 A1    Jul. 14, 2005

(51) Int. Cl.
*B21D 53/84* (2006.01)
*F02F 11/00* (2006.01)
*B23K 26/00* (2006.01)

(52) U.S. Cl. .................. 29/888.3; 29/458; 277/592; 219/121.64

(58) Field of Classification Search ........... 29/888.3, 29/458; 219/121.64; 277/592, 594–596, 277/598; 72/379.2, 414
See application file for complete search history.

(56) References Cited

U.S. PATENT DOCUMENTS

| | | | |
|---|---|---|---|
| 4,103,913 A * | 8/1978 | McDowell | 277/592 |
| 4,873,415 A * | 10/1989 | Johnson et al. | 219/121.64 |
| 5,022,661 A * | 6/1991 | Nakasone | 277/591 |
| 5,277,434 A | 1/1994 | Kestly et al. | 277/235 |
| 5,431,418 A | 7/1995 | Hagiwara et al. | 277/235 |
| 5,490,681 A | 2/1996 | Plunkett et al. | 277/235 |
| 5,582,415 A | 12/1996 | Yoshida et al. | 277/235 |
| 5,628,518 A | 5/1997 | Ushio et al. | 277/180 |
| 5,938,208 A | 8/1999 | Yoshida et al. | 277/592 |
| 5,979,906 A | 11/1999 | Silvian | 277/593 |
| 6,053,503 A | 4/2000 | Buck et al. | 277/592 |
| 6,139,024 A | 10/2000 | Yakushiji et al. | 277/592 |
| 6,926,285 B1 * | 8/2005 | Suggs et al. | 277/610 |
| 2001/0052674 A1 | 12/2001 | Egloff | 277/591 |
| 2002/0170521 A1 | 11/2002 | Hilgert | 123/193.5 |
| 2002/0175478 A1 | 11/2002 | Hilgert | 277/591 |

* cited by examiner

*Primary Examiner*—David P. Bryant
*Assistant Examiner*—Sarang Afzali
(74) *Attorney, Agent, or Firm*—Robert L. Stearns; Dickinson Wright PLLC

(57) ABSTRACT

The subject invention provides a method of manufacturing a multi-layered steel gasket assembly including a plurality of steel gasket layers each having a predetermined electrical resistance and including at least one coating layer of a material having an electrical resistance substantially greater than that of the steel gasket layers. The method includes the steps of: applying the coating layer of the selected material to at least one surface of at least one of the steel gasket layers to provide at least one coated gasket layer; assembling the coated gasket layer with at least one other steel gasket layer such that the coating layer prevents the use of traditional resistance welding in joining the gasket layers; and thereafter welding the assembled gasket layers together by either a JAG or CO2 laser to form the multi-layered steel gasket assembly.

22 Claims, 2 Drawing Sheets

LASER WELDED MULTI-LAYERED STEEL GASKET ASSEMBLY

FIELD OF THE INVENTION

The subject invention relates generally to multi-layered steel gaskets for internal combustion engines, and more specifically to a method of manufacturing such a multi-layered steel gasket assembly.

BACKGROUND OF THE INVENTION

Multi-layered steel gaskets are traditionally used to form a seal between two mating components of a mechanical system or device, such as an internal combustion engine, to prevent leakage of combustion gases, cooling water, lubricating oil, or the like. Common applications involve placing a multi-layered steel gasket assembly between the engine block and cylinder head and between the engine block and exhaust manifold. Cylinder head gaskets typically extend around the cylinder bores of an engine to seal high-pressure combustion gases within the cylinder bores as well as seal oil and coolant passages. Exhaust manifold gaskets typically extend around the exhaust ports of an engine to seal high temperature exhaust gases flowing into the exhaust system. Once installed, the multi-layered steel gasket assembly bears the load from a bolted connection of the engine components and relies upon this load to provide an adequate seal therebetween.

Often, in the manufacture of multi-layered steel gaskets, at least one coating layer is disposed between a plurality of steel gasket layers to form a gasket assembly, such that the sealing ports defined by the gasket assembly are concentric. The coating layers are substantially coextensive with the plurality of steel gasket layers.

Often, the material selected for the coating layers has inherent an electrical insulating properties. Thus, the coating layers may have an electrical resistance substantially greater than that of the steel gasket layers, electrically insulating the plurality of steel gasket layers from each other. As such, the possibility of using resistance welding as the means of joining the plurality of steel gasket layers together is not feasible. In such cases, it is a common to secure the coated gasket layers together by means of rivets or eyelets. While effective, the use of rivets or eyelets add to the cost and complexity of manufacturing gaskets.

BRIEF SUMMARY OF THE INVENTION AND ADVANTAGES

The subject invention provides a method of manufacturing a multi-layered steel gasket assembly comprising a plurality of steel gasket layers having a pre-determined electrical resistance and at least one coating layer having an electrical resistance substantially greater than that of the steel gasket layers. The coating layer of the material is applied to at least one surface of at least one of the plurality of steel gasket layers to provide at least one coated gasket layer. The coated gasket layer and at least one other steel gasket layer are assembled in a desired configuration. Thereafter, the coated gasket layer and the other steel gasket layer are welded together by a laser to form the multi-layered steel gasket assembly.

Thus, it can be appreciated that the subject invention provides an improved method of manufacturing a multi-layered steel gasket assembly by welding the coated gasket layer and at least one other steel gasket layer together by a laser. This method eliminates the separate operation of joining the coated gasket layer and the other steel gasket layer by rivets or eyelets, thereby improving the efficiency of the manufacturing process and reducing the cost of the multi-layered steel gasket assembly.

BRIEF DESCRIPTION OF THE SEVERAL VIEWS OF THE DRAWINGS

Advantages of the subject invention will be readily appreciated, as the same becomes better understood by reference to the following detailed description when considered in connection with the accompanying drawing wherein.

DETAILED DESCRIPTION OF THE INVENTION

Figure 1:
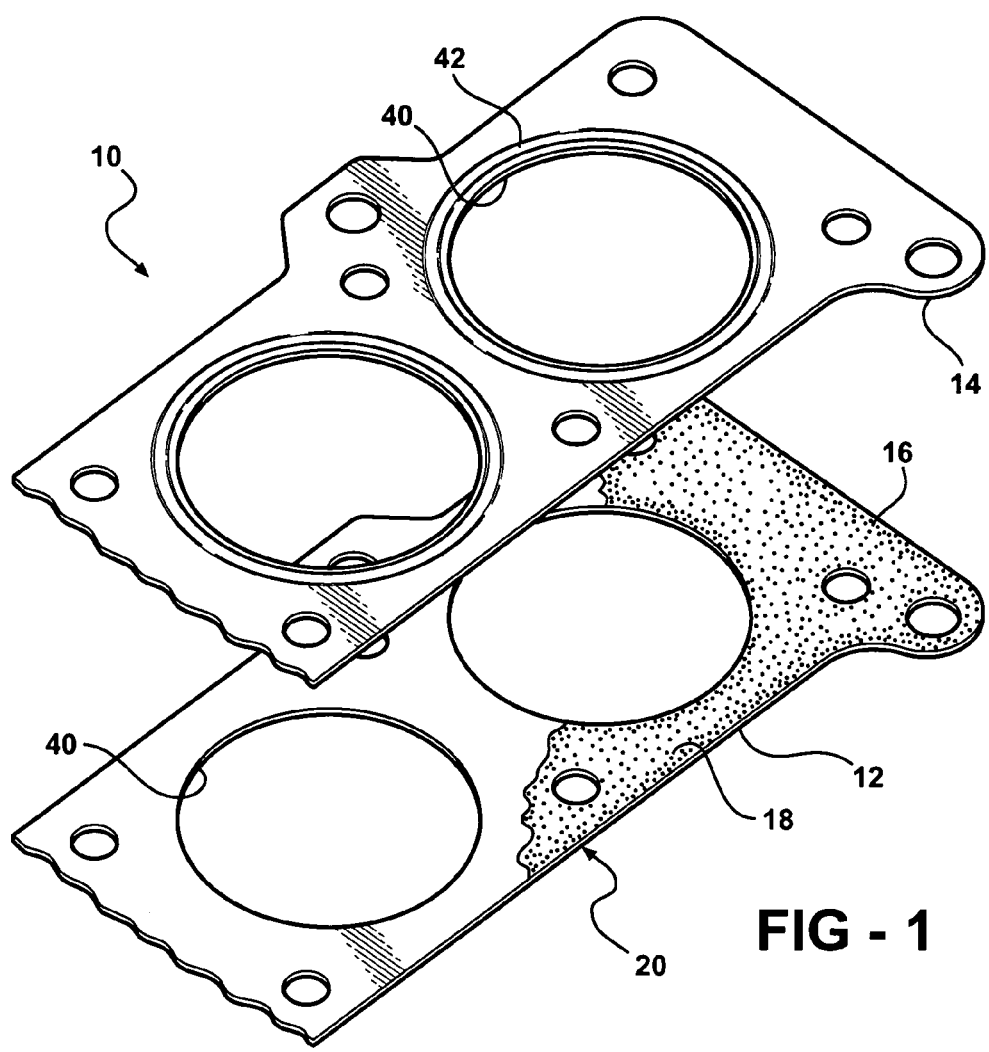
FIG. 1 is an exploded fragmentary perspective view of a multi-layered steel gasket assembly.

Referring to FIG. 1, the subject invention provides a method of manufacturing a multi-layered steel gasket assembly generally shown at 10 and including a plurality of steel gasket layers 12, 14, each having a predetermined electrical resistance, and including at least one coating layer 16 of a material having an electrical resistance substantially greater than that of the plurality of steel gasket layers 12, 14. The method of manufacturing the multi-layered gasket assembly 10 includes the steps of: applying the at least one coating layer 16 of the material to at least one surface 18 of at least one of the plurality of steel gasket layers 12, 14 to provide at least one coated gasket layer generally indicated at 20; assembling the at least one coated gasket layer 20 with at least one other steel gasket layer 14; and thereafter welding the assembled gasket layers together by one of a JAG or $CO_2$ laser to form the gasket assembly 10.

As the material chosen for the at least one coating layer 16 has a significantly higher electrical resistance than that of the plurality of steel gasket layers 12, 14, it is not always possible to use traditional resistance welding to weld the assembled gasket layers; for example, when the at least one coating layer 16 is disposed between the plurality of steel gasket layers 12, 14. The subject invention provides for welding the plurality of steel gasket layers 12, 14 together with a laser, wherein a weld 46 extends through the at least one coating layer 16 disposed therebetween. The weld 46 is produced by a laser, and unlike traditional resistance welding, does not require an electrical ground to operate. The laser is therefore able to produce a weld 46 between the plurality of steel gasket layers 12, 14 with the at least one coating layer 16 of significantly higher electrical resistance disposed therebetween preventing an electrical ground between the plurality of steel gasket layers 12, 14.

The method of manufacturing the multi-layered steel gasket assembly 10 may further include a step of positioning the plurality of steel gasket layers 12, 14 and the at least one coating layer 16. The plurality of steel gasket layers 12, 14 and the at least one coating layer 16 are positioned in a desired configuration prior to assembly.

Figure 2:
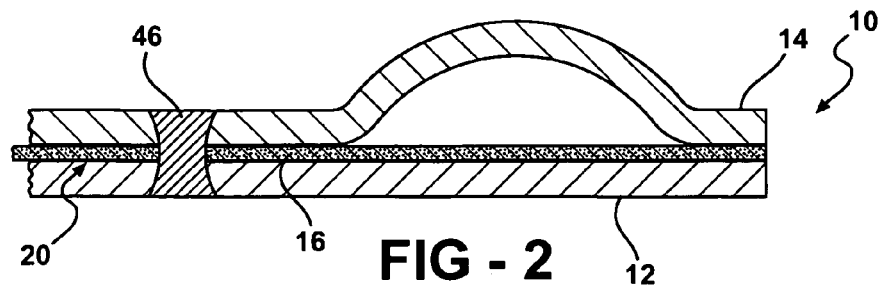
FIG. 2 is a fragmentary cross sectional view of a multi-layered steel gasket assembly.

Referring to FIG. 2, one possible configuration of the gasket assembly 10 includes positioning a first 12 and second 14 steel gasket layer and at least one coating layer 16 wherein the at least one coating layer 16 is disposed between a joining surface of the first 12 and second 14 steel gasket layers.

Figure 3:
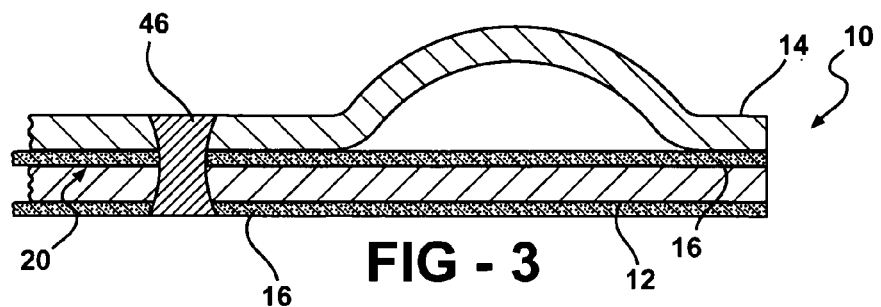
FIG. 3 is a fragmentary cross sectional view of another embodiment of the multi-layered steel gasket assembly.
Figure 4:
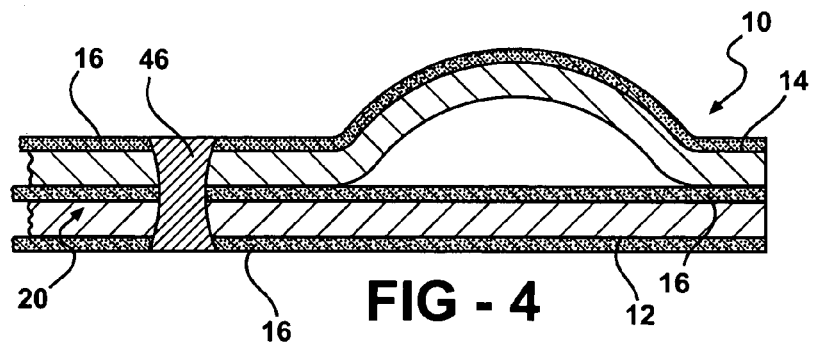
FIG. 4 is a fragmentary cross sectional view of another embodiment of the multi-layered steel gasket assembly.

Referring to FIGS. 3 and 4, a second possible configuration of the gasket assembly 10 includes positioning a first 12 and second 14 steel gasket layer and a plurality of coating layers 16 wherein at least one of the plurality of coating layers 16 is disposed between a joining surface of the first 12 and second 14 steel gasket layers and at least one of the plurality of coating layers 16 covers a non-joining surface of the first 12 and/or second 14 steel gasket layers.

Figure 5:
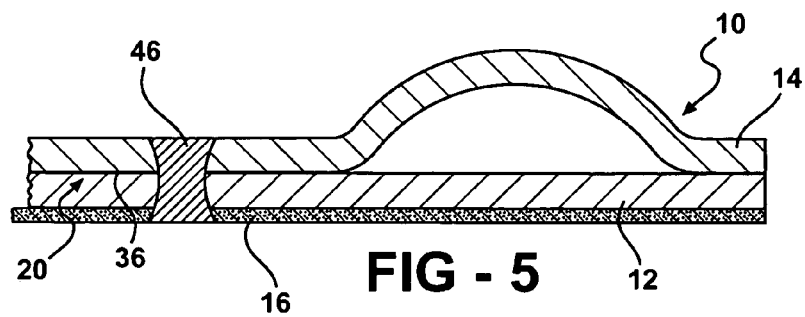
FIG. 5 is a fragmentary cross sectional view of another embodiment of the multi-layered steel gasket assembly.
Figure 6:
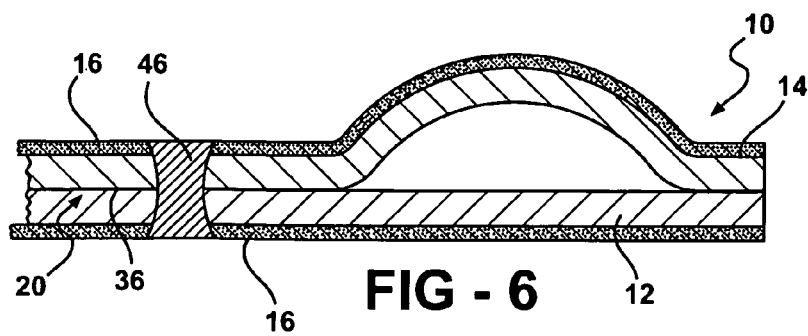
FIG. 6 is a fragmentary cross sectional view of another embodiment of the multi-layered steel gasket assembly.

Referring to FIGS. 5 and 6, a third possible configuration of the gasket assembly 10 includes positioning a first 12 and second 14 steel gasket layer and at least one coating layer 16 wherein a joining surface 36 of the first 12 and second 14 steel gasket layers are in direct contact with one another and the at least one coating layer 16 is in contact with a non-joining surface of the first 12 and/or second 14 steel gasket layers.

Referring to FIG. 1, the method of manufacturing the multi-layered steel gasket assembly 10 may further include a step of placing the plurality of steel gasket layers 12, 14 and the at least one coating layer 16 in a forming die.

A shaping step may also be included in the method of manufacturing the multi-layered steel gasket assembly 10. During the shaping step, the forming die shapes the plurality of steel gasket layers 12, 14 and the at least one coating layer 16. The preferred shape of the plurality of steel gasket layers 12, 14 and the at least one coating layer includes a plurality of aligned apertures 40 formed in the plurality of steel gasket layers 12, 14 and the at least one coating layer 16; and a plurality of resilient sealing beads 42 formed in at least one of the plurality of steel gasket layers 12, 14 and around at least one of the plurality of apertures 40 defined by the plurality of steel gasket layers 12, 14.

While it is contemplated that the step of welding the assembled gasket layers together may be performed at any time after assembling the gasket assembly 10, a preferred manufacturing process is to weld the assembled gasket layers together after the step of shaping the gasket assembly 10 and while the assembled gasket layers are in the forming die. It is possible that the step of welding the assembled gasket layers together while the assembled gasket layers are in the forming die may be performed before or after the shaping step.

A preferred material for the at least one coating layer 16 is molybdenum, although one skilled in the art will realize that there are several alternative materials that may be utilized for their specific material properties. The material chosen will be dependent upon the intended purpose of the gasket assembly and the required characteristics of the coating material.

Figure 7:
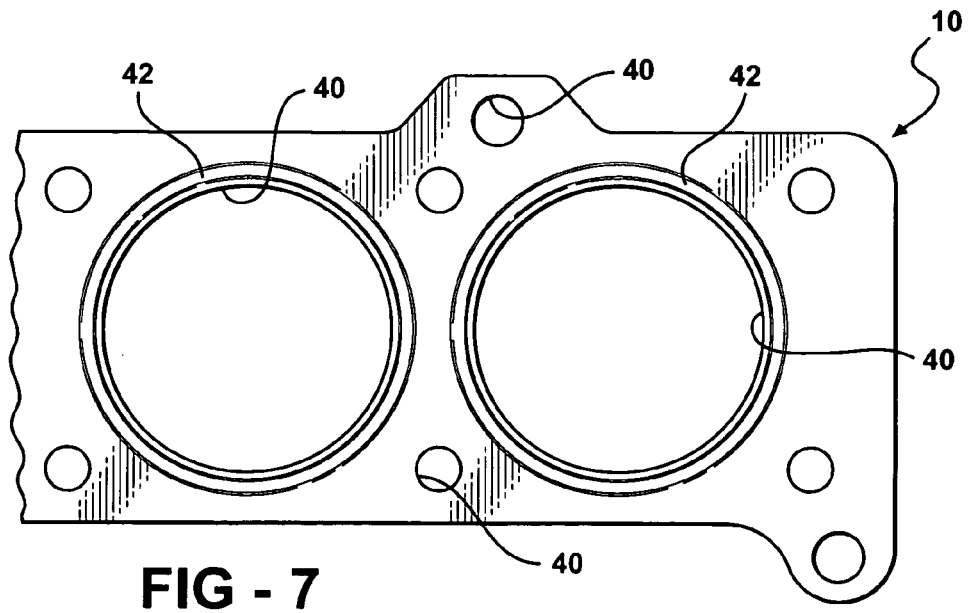
FIG. 7 is a fragmentary top view of the multi-layered steel gasket assembly.

As such, referring to FIGS. 2 and 7, a preferred embodiment of the gasket assembly 10 produced by the method of manufacturing includes the first 12 and second 14 steel gasket layers and the coating layer 16 of molybdenum disposed therebetween. The gasket assembly is joined together by the laser weld 46 connecting the first 12 and second 14 steel gasket layers and extending through the coating layer 16.

Obviously, many modifications and variations of the present invention are possible in light of the above teachings. It is, therefore, to be understood that within the scope of the appended claims, the invention may be practiced otherwise than is specifically described. The invention is defined by the claims.

What is claimed is:

1. A method of manufacturing a gasket assembly including a plurality of steel gasket layers each having a predetermined electrical resistance and including at least one coating layer of a material having an electrical resistance substantially greater than that of the steel gasket layers and axially aligned apertures to be sealed, said method comprising the steps of:

applying the at least one coating layer of the material to at least one surface of at least one of the plurality of gasket layers to provide at least one coated gasket layer;

assembling the at least one coated gasket layer with at least one other gasket layer; and thereafter welding the assembled gasket layers together with a weld extending through said plurality of gasket layers and said at least one coating layer near said apertures to form the gasket assembly.

2. A method as set forth in claim 1 further including the step of positioning the plurality of gasket layers and the at least one coating layer wherein the plurality of gasket layers and the at least one coating layer are positioned in a desired configuration prior to assembly.

3. A method as set forth in claim 2 further including the step of placing the plurality of gasket layers in a forming die prior to welding.

4. A method as set forth in claim 3 further including the step of shaping the gasket layers in the forming die.

5. A method as set forth in claim 4 wherein the step of welding the gasket layers together is performed in the forming die.

6. A method as set forth in claim 2 wherein the step of positioning the plurality of gasket layers and the at least one coating layer is further defined as positioning a first and second gasket layer and a coating layer wherein the coating layer is disposed between a joining surface or the first and second gasket layers.

7. A method as set forth in claim 2 wherein the step of positioning the plurality of gasket layers and the at least one coating layer is further defined as positioning a first and second gasket layer and a plurality of coating layers wherein at least one of the plurality of coating layers is disposed between a joining surface of the first and second gasket layers and at least one of the plurality of coating layers covers a non-joining surface of the first or second gasket layers.

8. A method as set forth in claim 2 wherein the step of positioning the plurality of gasket layers and the at least one coating layer is further defined as positioning a first and second gasket layer and a plurality of coating layers wherein at least one of the plurality of coating layers is disposed between a joining surface of the first and second gasket layers and at least one of the plurality of coating layers covers a non-joining surface of the first and second gasket layers.

9. A method as set forth in claim 2 wherein the step of positioning the plurality of gasket layers and the at least one coating layer is further defined as positioning a first and second gasket layer and a coating layer wherein a joining surface of the first and second gasket layers are in direct contact with one another and the coating layer is in contact with a non-joining surface of the first or second gasket layers.

10. A method as set forth in claim 2 wherein the step of positioning the plurality of gasket layers and the at least one coating layer is further defined as positioning a first and second gasket layer and a plurality of coating layers wherein a joining surface of the first and second gasket layers are in direct contact with one another and at least one of the plurality of coating layers is in contact with a non-joining surface of the first and second gasket layers.

11. A method as set forth in claim 1 wherein the step of welding the assembled gasket layers together is further defined as welding the assembled gasket layers together by a laser.

12. A method as set forth in claim 11 wherein the step of welding the assembled gasket layers together is performed by one of a JAG or CO2 laser.

13. A method as set forth in claim 1 wherein the coating layer material is selected as molybdenum.

14. A method of manufacturing a gasket assembly comprising the steps of:
    providing a plurality of generally flat steel gasket layers having a predetermined electrical resistance;
    forming at least one aperture in each of said steel gasket layers;
    applying a coating layer having an electrical resistance substantially greater than said steel gasket layers to at least one of said steel gasket layers;
    placing said plurality of generally flat steel gasket layers in a forming die and arranging said apertures in axial alignment with one another;
    forming sealing beads in said forming die in said steel gasket layers adjacent said axially aligned apertures; and
    welding said gasket layers to one another in said forming die.

15. The method of claim 14 further including forming a weld near said sealing bead in said forming die.

16. The method of claim 15 including forming said weld completely through said steel gasket layers and said coating layer.

17. The method of claim 16 further including sandwiching at least one of said coating layers between opposed surfaces of said steel gasket layers.

18. The method of claim 17 further including forming said coating layers with molybdenum.

19. The method of claim 14 further including forming said weld without establishing an electrical ground.

20. The method of claim 19 further including forming said weld with a laser.

21. The method of claim 14 further including performing said welding step after said forming step.

22. The method of claim 14 further including performing said welding step before said forming step.

* * * * *